(12) United States Patent
Wang

(10) Patent No.: US 10,960,451 B2
(45) Date of Patent: Mar. 30, 2021

(54) ENHANCED METHOD AND EQUIPMENT OF FORGING BOW-SHAPE CONJOINTED RAKE

(71) Applicant: TANGSHAN SHUSHI HARDWARE TOOLS MANUFACTURE CO., LTD., Hebei (CN)

(72) Inventor: Yongjun Wang, Tangshan (CN)

(73) Assignee: TANGSHAN SHUSHI HARDWARE TOOLS MANUFACTURE CO., LTD., Hebei (CN)

(*) Notice: Subject to any disclaimer, the term of this patent is extended or adjusted under 35 U.S.C. 154(b) by 235 days.

(21) Appl. No.: 16/129,320

(22) Filed: Sep. 12, 2018

(65) Prior Publication Data
US 2020/0047236 A1 Feb. 13, 2020

(30) Foreign Application Priority Data
Aug. 13, 2018 (CN) .......................... 201810916626.5

(51) Int. Cl.
*B21D 53/68* (2006.01)
*B21D 22/02* (2006.01)
(Continued)

(52) U.S. Cl.
CPC .............. *B21D 22/022* (2013.01); *A01D 7/02* (2013.01); *B21K 11/14* (2013.01)

(58) Field of Classification Search
CPC ........ B21D 53/68; B21D 53/70; B21D 53/72; B21D 22/022; B21D 35/001; B21K 11/14; B21J 1/06
See application file for complete search history.

(56) References Cited

U.S. PATENT DOCUMENTS

| 277,529 | A | * | 5/1883 | Young | ..................... | B21D 53/68 76/111 |
| 281,634 | A | * | 7/1883 | Knowlton | .............. | B21D 53/68 76/111 |

(Continued)

FOREIGN PATENT DOCUMENTS

| CA | 2122417 A1 | 10/1994 |
| CN | 102189381 B | 11/2012 |

(Continued)

*Primary Examiner* — David Duffy
*Assistant Examiner* — Bobby Yeonjin Kim
(74) *Attorney, Agent, or Firm* — Birch, Stewart, Kolasch & Birch, LLP

(57) ABSTRACT

This application provides an enhanced method and equipment for forging bow-shape Conjointed rake with one-piece steel. The methods of the present application include: S1: heating the rectangular blank to target temperature; S2: stamping the rectangular blank to mold rake tooth with rake handle blank reserved at both sides, and conduct cutting at the shoulder; S3: horizontally forging and stamping the rake handle blanks at both sides respectively to columnar; S4: heating the rake handle blank locally, stretching the rake handle blank with roll forging machine to mold rake handle, and bending the rake handle back in reverse to the rake tooth; S5: bending the rake handle stretched out from the sides inward and forge the two ends of the rake handle together to form the main body of the bow-shape rake; S6: placing the main body of the bow-shape rake between the convex stamping equipment to stamp the rake tooth.

2 Claims, 13 Drawing Sheets

(51) Int. Cl.
*A01D 7/02* (2006.01)
*B21K 11/14* (2006.01)

(56) References Cited

U.S. PATENT DOCUMENTS

| | | | | |
|---|---|---|---|---|
| 323,913 A * | 8/1885 | Clarke | ............ | B21D 53/68 76/111 |
| 524,719 A * | 8/1894 | Kretsinger | ............ | B21D 53/68 72/337 |
| 1,142,000 A * | 6/1915 | Whitney | ............ | B21D 53/68 76/111 |
| 1,171,764 A * | 2/1916 | Barden | ............ | B21D 53/68 76/111 |
| 1,279,660 A * | 9/1918 | Cowdery | ............ | B21D 53/68 76/111 |
| 1,733,260 A * | 10/1929 | Hermanni | ............ | B21D 53/68 76/111 |
| 2,039,771 A * | 5/1936 | Bishop | ............ | B21D 53/68 76/111 |
| 2,237,722 A * | 4/1941 | Wharton | ............ | B21D 53/68 76/111 |
| 2,968,974 A * | 1/1961 | Everett | ............ | A01D 7/00 72/339 |
| 3,673,893 A * | 7/1972 | Keller | ............ | A01D 7/08 76/111 |
| 5,431,001 A | 7/1995 | Lange | | |
| 5,440,868 A | 8/1995 | Darnell | | |
| 5,522,209 A | 6/1996 | Petruzzelli | | |
| 8,248,652 B2 | 8/2012 | Wardell et al. | | |
| 8,423,973 B2 | 4/2013 | Saunders et al. | | |

FOREIGN PATENT DOCUMENTS

FR        686834 A      7/1930
GB       664117 A      1/1952

* cited by examiner

ENHANCED METHOD AND EQUIPMENT OF FORGING BOW-SHAPE CONJOINTED RAKE

RELATED APPLICATION

The present application claims priority of Chinese Patent Application No. 2018109166265, filed on Aug. 13, 2018, entitled "An Enhanced Method and Equipment of One-piece Forging Bow-Shape Conjointed Rake".

TECHNICAL FIELD

The present invention related to farm implements area, and in particular, to an enhanced method of forging bow-shape Conjointed rake with one-piece steel.

BACKGROUND ART

Garden implements refer to the implements used in gardening. According to usage place, garden implements may be classified as horticultural tools and garden tools; and according to users, garden implements may be classified as household tools and professional tools.

Of the garden implements, rake is very important and can be used for plowing in surface soils with plowing depth no more than 15 cm. A rake consists of a wood handle and a rake head, and the rake head is equipped with iron tooth used to crush soils in flat lands, harrow soils, pile up fertilizers, harrow grasses, and level vegetable gardens.

The rake head of the existing garden implements is stamping welded separately. Such products have problems in their materials as well as in the processing methods, therefore, in the using process, the rake head would have problems, such as rake tooth deformation, breakage at the joint between bow-shape handle and rake body.

The existing technology (CN201110102157) discloses a method of one-piece forging bow-shape Conjointed rake, by which a bow-shape rake is formed through five times of stamping and forging under heating. However, such method is complicate, and it is found that, when the forging method of such technology is adopted, the production yield and the degree of the product standardization are low, moreover, in the forging process, it is easy to form bulges in the middle part, and the bulges need to be handled by significant increasing of forgings or secondary cutting or forging.

U.S. Ser. No. 08/248,652 discloses a foldable rake implement includes an elongated handle having a proximal end to be grasped by the user and a distal end. An articulated frame structure is attached to the handle at the distal end. The articulated frame structure includes a central axis of articulation dividing the frame structure into two mirror-image first and second frame halves. The axis of articulation is coaxial with the handle and defines an axis about which the articulated frame structure moves between an unfolded position whereat the first and second frame halves of the frame structure symmetrically project outwardly to opposite lateral sides of the handle and a folded position whereat the first and second frame halves are moved toward each other and into generally mutual overlaying relationship. The articulated frame structure further includes a plurality of spaced-apart tines, a plurality of first transverse fingers projecting outwardly from one side of the first frame half, and a plurality of second transverse fingers projecting outwardly from one side of the second frame half opposite the first fingers.

However, the rake in this application adopts an articulated frame structure attached to the handle at the distal end, which is not made of one-piece steel. Thus, it is not that firm.

U.S. Ser. No. 08/423,973 discloses a Lawn rake and rake head. In this application, an array of tines are connected to and extend out from a rake head support bar at right angles thereto and are connected thereto in two sets with shank portions of a first set of tines disposed in a first plane and shank portions of a second set of tines disposed in a second plane parallel to said first plane. Action ends of the first set of tines are disposed in a first row which is parallel to and spaced further from said rake head support bar than action ends of the second set of tines which are disposed in a second row. A coil spring is formed from the material of the shank portion of each of the tines so as to unwind if a force is applied to the tine as in effecting a raking action. An alternate embodiment includes a third set of tines similar to the first and second set but with its shank portions in a third plane parallel to the first and second planes and with its tine ends in a third row parallel to the first and second rows. Another alternate forms the tines as substantially "U" shaped members each with a pair of spaced legs each such leg having a shank portion, coil spring and action end and with threaded members connecting a connecting portion of each tine to the rake head. Another embodiment includes wheels carried by the rake head.

However, the array of tines in the rake of U.S. Ser. No. 08/423,973 are connected to the rake head, which is not firm enough and easy to fall off.

SUMMARY OF THE INVENTION

Thus, there is not a method that can produce a firm bow-shape rake with high production yield and degree of standardization but without unnecessary repeated operations in forging process.

On one aspect, the present invention provides an enhanced method for forging bow-shape Conjointed rake with one-piece steel, characterized in that the method includes the following steps:

S1: preparing a rectangular blank of steel of which the width is bigger than the width of the target bow-shape rake and the height is bigger than the longest rake tooth of the target bow-shape rake, and heating it to a target temperature;

S2: Stamping the rectangular blank to mold rake tooth with rake handle blank reserved at both sides of the rake tooth, obtaining a rake main body with rake tooth and rake handle blank on one side and rake back on the other side, and cutting off the two corners of the rake back slantly;

S3: Bending the rake handle blanks away from the rake tooth, and horizontally forging and rotating the rake handle blanks to make them become column shape, respectively;

S4: Heating the rake handle blank locally, stretching the rake handle blank to mold rake handle, and bending the rake handle back to a direction reverse to the rake tooth;

S5: Bending the rake handle inward and forge the two ends of the rake handle together;

S6: Bending the all the rake tooth of the bow-shape rake toward a same direction to become arc shape.

Preferably, the target temperature is higher than or equal to 900° C.

Preferably, the rectangular blank is made of carbon steel.

Preferably, the rectangular blank is with a length of 35-60 cm and width 8-20 cm.

Preferably, the step S5 is realized by using a bending equipment

On another aspect, the present invention provides a producing equipment for forging bow-shape Conjointed rake with one-piece steel, characterized in that the producing equipment consists of: a steel heating unit, a rake tooth stamping device, a second stamping device, a roll forging device, and a rake handle bending device, the steel plate heating unit is used to heat rectangular blank of steel above a target temperature, the rake tooth stamping device is used to stamp the rectangular blank to form the rake body with rake tooth, the second stamping device is used to further stamp the rake body to form its shoulder, the roll forging device is used to forge the two outermost rake tooth to form two rake handles, and the rake handle forming device is used to form the rake handle once.

On another aspect, the present invention provides a bending equipment used in the method of claim 1, the bending equipment consists of: body frame, motor drive, slide rod, cross bending rod, carriage, bearings, arc sliding chute, and arc baffle.

It shall be noted that, in the present invention, after the rake body blank is heated, if the subsequent steps are proceeded continuously and the rake body temperature is sufficient for proceeding the subsequent steps, secondary heating is unnecessary, but if the interval of the subsequent steps is too long and the blank temperature decreases to the extent insufficient for proceeding the follow-up forging, the technicians of the technology field may add local or whole heating between the steps.

By the method of the present invention, the rake will be firm enough since it is forged from one-piece steel, there is not any connection for the rake head. Furthermore, the production yield and the degree of the product standardization can be promoted significantly, and in the forging process, immediate bulges can be avoided and forging times can be decreased in the process of bow-shape handle stamping and forging.

DETAILED DESCRIPTION OF THE INVENTION

The following is to describe the present invention in details in combination with drawings and examples, but the protection scope of the invention is not limited within the scope described in the Example accordingly.

Embodiment 1

Figure 1:
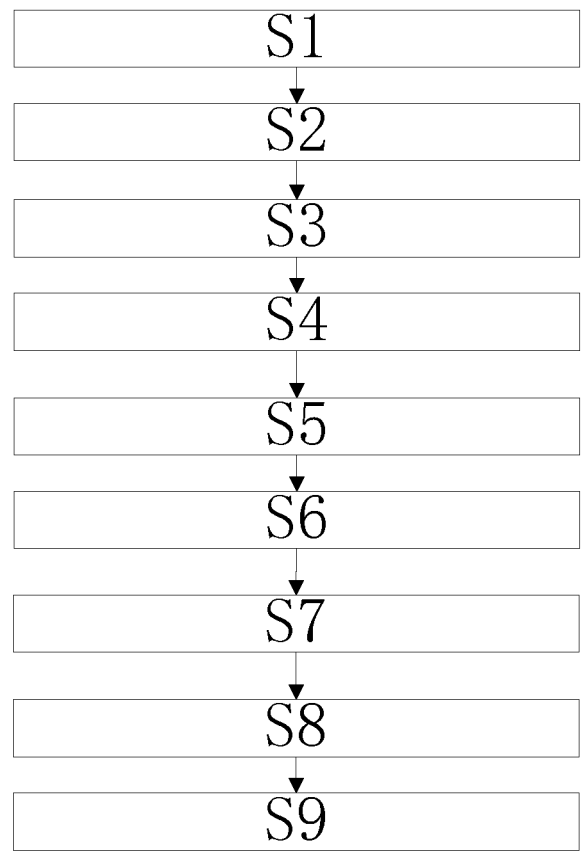
FIG. 1 is a flow chart of the Enhanced Method of One-piece Forging Bow-shape Conjointed Rake of the Present Invention.
Figure 2:
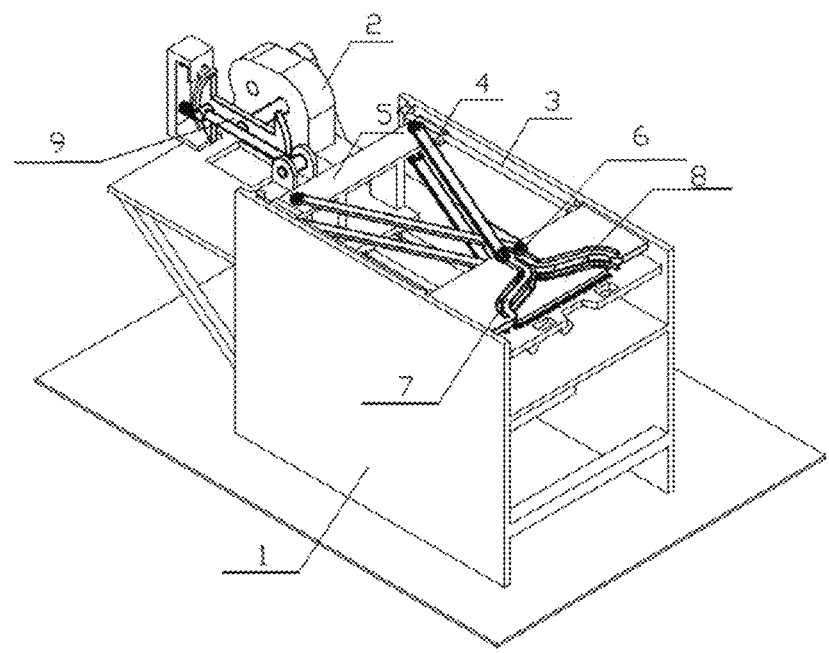
FIGS. 2-4 are Schematic Diagrams of Rake Handle Bending Machine as Provided in Example 3 of the Present Invention.

FIG. 1 along with FIGS. 8-16 demonstrate the process of the enhanced one-piece bow-shape Conjointed rake preparing method as described in examples of the present invention.

Figure 8:
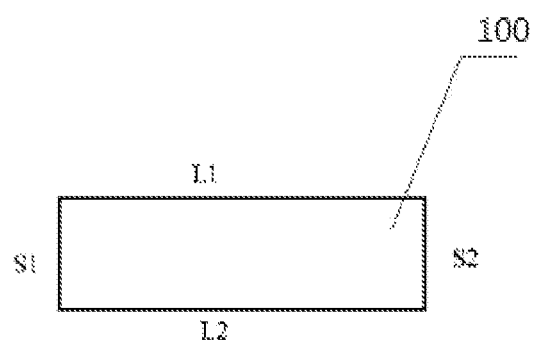
FIG. 8 is a schematic diagram of a rectangular blank of steel 100 used for making a Bow-shape Conjointed Rake.

As shown in the figures, the method of the invention includes the following steps:

S1: Provide a rectangular blank of steel 100 as shown in FIG. 8, which includes two longer sides L1 and L2 of the same length in a range of 35-60 cm and two shorter ends S1 and S2 of the same width in a range of 8-20 cm, and heat the rectangular blank of steel 100 to a target temperature of 1000-1200° C. This step is used to prepare for the following first stamping of rake tooth and blank shoulder. The heating temperature of this time is higher than the subsequent heating temperature to guarantee the stamping effect.

Figure 9:
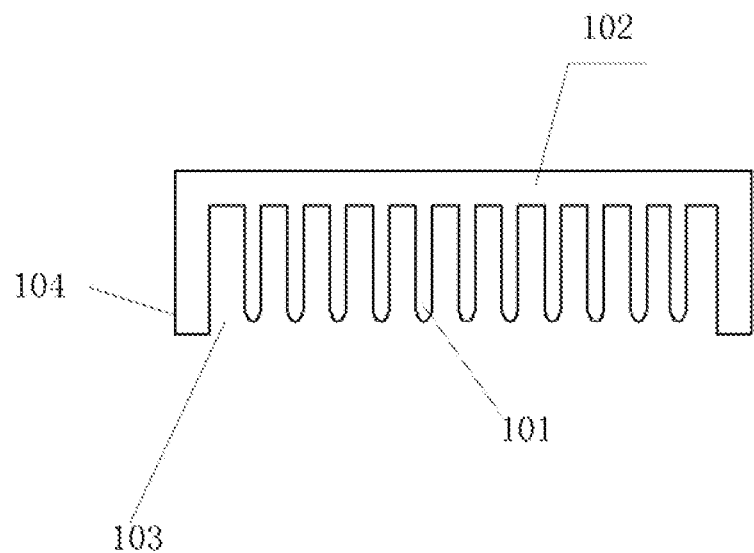
FIG. 9 is a schematic diagram of a punched rectangular blank of steel 101 with two rake handle blanks 103 and rake teeth 102.

S2: Use a stamping equipment to stamp the rectangular blank of steel 100 to mold rake teeth 101 on one of the longer sides of the rectangular blank of steel 100 (as shown in FIG. 9, the rake teeth 101 being formed in the L2 side) leaving two rake handle blanks 104, each rake handle blank 104 positioned at one shorter end of the rectangular blank of steel 100 slightly separated from the rake teeth 101 by a space 103, obtaining a rake main body with the rake teeth 101 on one longer side L2 and a rake back 102 on the other longer side L1.

Figure 10:
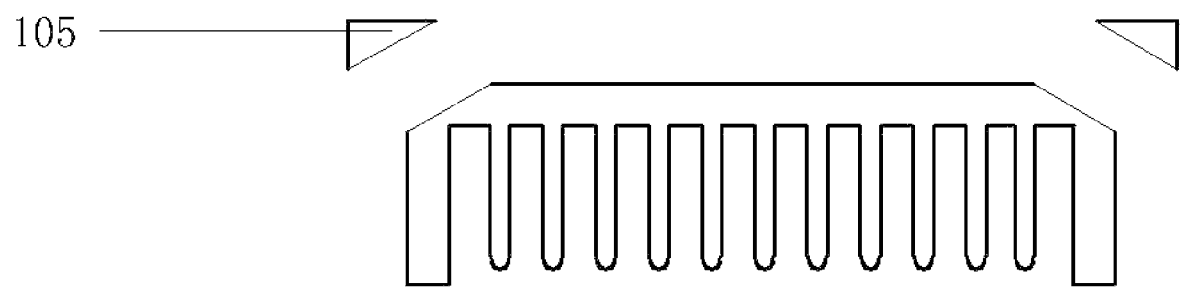
FIG. 10 is a schematic diagram showing how the corner of the punched rectangular blank of steel 101 is cut.

S3: Cut off triangles 105 respectively at each corner along the longer side L1 of the rectangular blank (as shown in FIG. 10). This process may be performed during the step of S2. Alternatively, the step of cutting off the triangles at the two corners may be executed separately after the stamping of the rake tooth.

Figure 11A:
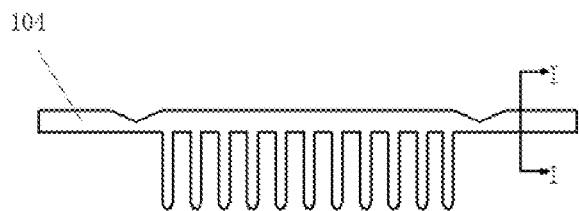
FIGS. 11a and 11b are schematic diagrams showing the result of bending the rake handle blanks, where a cross section taken at I-I of the rake handle blank is shown in FIG. 11b.
Figure 11B:
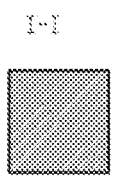

S4: Bend the rake handle blanks 104 away from the rake teeth so that they extend in a lateral direction as shown in FIG. 11a, where the cross section of the rake handle blanks 104 is shown in FIG. 11b.

S5: Heat the rake handle blanks 104 locally (at the portion of the rake handle blanks 104), and for each of the rake handle blanks 104, using a roll forging machine and repeat two steps to make it become longer and become a column shape respectively. The two steps include a first step of forging/pressing each of the rake handle blanks 104 in a direction perpendicular to respective rake handle blank, and a second step of rotating the respective rake handle blank so as to press different sides of the respective rake handle blank.

Figure 12A:
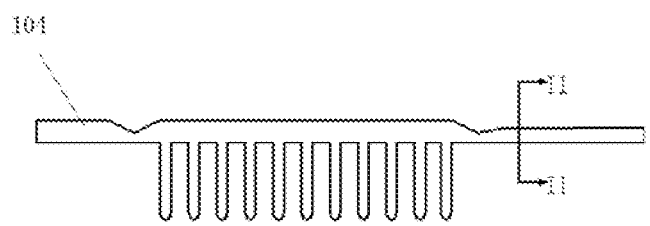
FIGS. 12a and 12b are schematic diagrams showing the rake after forging/hard pressing the rake handle blanks to make it longer, where a cross section taken at II-II of the rake handle blank is shown.
Figure 12B:
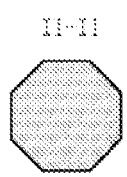
Figure 13:
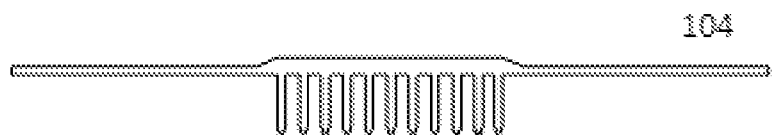
FIG. 13 is a schematic diagram showing the rake after the rake handle blanks are stretched to be longer enough.

S6: Heat the column shaped rake handle blank 104 (the shape of which is shown in FIG. 12a and FIG. 12b) locally, and stretch each of the rake handle blanks 104 so that they become longer and thinner for being used as rake handles (the shape of which is shown in FIG. 13).

Figure 14:
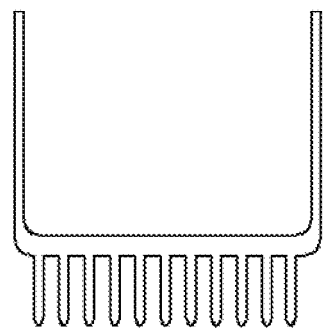
FIG. 14 is a schematic diagram showing the rake after the rake handle blanks are bent over in a direction reverse to the rake teeth 101.

S7: Bend the rake handles back to a direction reverse to the rake teeth, as shown in FIG. 14.

Figure 15:
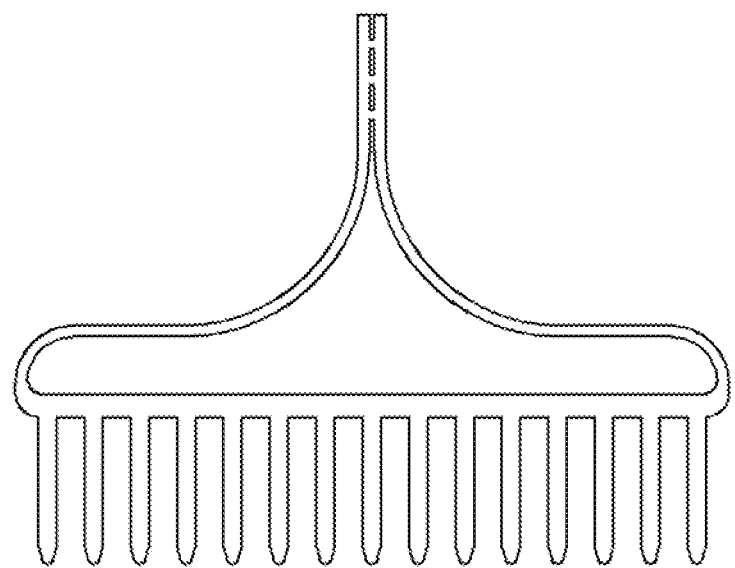
FIG. 15 is a schematic diagram showing the rake after the two rake handle are bent inward.

S8: Bend the rake handle inward and forge/press the two ends of the rake handle together, as shown in FIG. 15.

Figure 16:
FIGS. 16 and 17 are schematic diagrams showing the rake after the rake teeth are bent to become arc shape.
Figure 17:
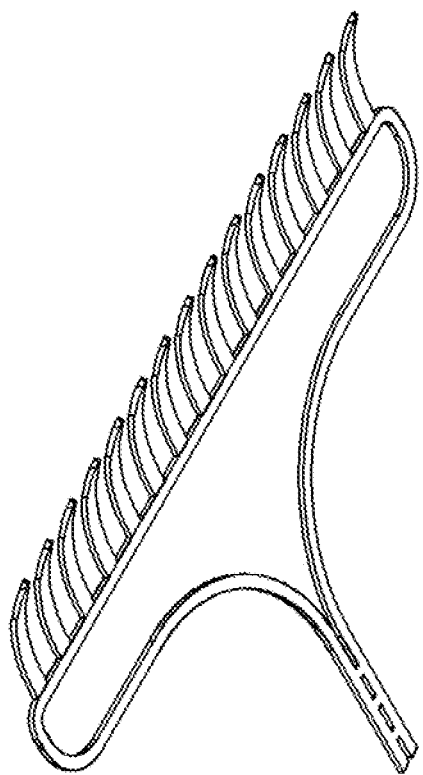

S9: Place the main body of the rake in a convex forging equipment to bend all the tips of the rake teeth of the bow-shape rake toward a direction perpendicular to the rake teeth to become arc shape, as shown in FIG. 16.

The step of S8 is realized by the two-side synchronous bending machine related to the invention, which will be described in detail later.

The aforesaid convex forging equipment consists of fastening end of the rake handle and the bow-shaping end of the rake tooth, the fastening end of the rake handle is slightly wider than the rake handle of the bow-shape rake, the arc end of the rake tooth has bending surface, and the curve of the bending surface or the bending angle matches the target bending curve or angle.

In the method of the present invention, the target temperature for locally heated is higher than or equal to 900° C. or higher than or equal to 1000° C. And the rectangular blank is made of carbon steel or other steel.

In this example, since the step of shoulder cutting is adopted, there is a thin separating section formed between the rake handle blank and the rake tooth. In the process of repeatedly forging the rake handle blank to make the rake handle blank thinner and form rake handle, the forging times can be reduced effectively to avoid bulges between the rake handle and the rake tooth and reducing defective products.

The statistics data over the forging times and number of defective products of 100 pcs of products is as follows:

| 100 pcs products | Method of the Present Invention | Existing Method without Cutting Shoulder |
| --- | --- | --- |
| Average Forging Times | 13.5 times | 19.7 |
| Circumstances under which secondary cutting or other treatment shall be done | 0 | 13 |
| Number of defective products | 1 | 7 |

Embodiment 2

In this embodiment, the method consists of the following steps:

S1: Take a rectangular blank of which the width is bigger than "W+A+2B" ("W" refers to the width of the target bow-shape rake, A=8 cm+width of a single rake tooth, and "B" refers to the width of the reserved blank for forging rake handle) and the height is bigger than "P+2Q" ("P" refers to the longest rake tooth of the target bow-shape rake, "Q" refers to the width of the rake backside), and heat it to target temperature 1000-1200° C.

S2: On one side of the rectangular blank, using stamping equipment to stamp and form a molded rake body blank which consists of rake tooth as many as the final rake tooth and reserved part for rake handle which is at the two sides of the row of rake tooth and wider than a single rake tooth.

The stamping equipment consists of an upper stamping platform and a lower stamping platform, and the lower stamping platform has several stamping tooth with separations (spaces) between the stamping tooth, the width of each separation equal to the width of a rake, and the width between the outermost stamping teeth at the left and right sides is equal to the width of the reserved rake handle part. The stamping tooth of the upper stamping platform are aligned with the separations between the stamping tooth of the lower stamping platform, while the stamping tooth of the lower stamping platform are aligned with the spaces between the stamping tooth of the upper stamping platform. To conduct the stamping, place a heated rectangular blank on the lower stamping platform, and when the upper stamping platform falls down, form a rake body with rake tooth, rake back (a connection portion for the tooth), and, one rake handle blank at each sides of the rake body. The rest part of the rectangular blank is named as the residual blank and can be used for forming another rake body.

After the rake body is stamped down, turn the residual blank around, place the residual blank on the lower stamping platform and place the original space part (between which the rake tooth are plushed down during the first stamping) between the position of plushing tooth the lower stamping platform, and conduct the second stamping to form the second rake body blank. By adopting this manner, the blank with an area less than 1.5 times of the original steel blank can form 2 pieces of rake body blanks, thus the cost is decreased significantly.

S3: Next, place the rake body blank under the second stamping equipment which is used to stamp the two triangular notches at the two sides of the rectangular rake body backside. Stamp and cut off two triangles at the two top corners sides of the longer side to form the shoulder. It should be noted that the process of stamping the triangular shoulder can be completed in S2 step or be completed independently after S2.

S4: After the stamping is completed, laterally forge (so as to press) the rake handle blanks of the two sides separately and repeatedly to make each of the rake handle blank become a column. Since two triangular parts are cut into shoulder through the stamping in the aforesaid step, there is separation section formed between the rake handle and the rake tooth, when forge the rake handle blank into column, plenty of time is saved, forging times are reduced, and there is no bulge produced between the rake handle blank and the rake handle, and production efficiency is promoted significantly.

S5: Heat the rake handle blank locally, stretch the rake handle blank with roll forging machine to mold rake handle, and bend the rake handle back so that it is in a direction reverse to the rake tooth;

S6: Bend the rake handle inward (toward each other) and forge the two ends of the rake handle together to form the main body of the bow-shape rake;

S7: Place main body of the bow-shape rake between a forging/Punching equipment (with a concave shape upper punching block and a convex shape lower punching block) to press/forge the rake tooth to a bow-shape.

The aforesaid convex stamping equipment consists of fastening end of the rake handle and the bow-shaping end of the rake tooth, the fastening end of the rake handle is slightly wider than the rake handle of the bow-shape rake, the arc end of the rake tooth has bending surface, and the curve of the bending surface or the bending angle matches the target bending curve or angle.

Example 3

The producing equipment for bow-shape Conjointed rake consists of: steel heating unit, rake tooth stamping/punching device, a second stamping/punching device, a third stamping/punching device, roll forging device, and rake handle bending device. The steel heating unit is used to heat the rectangular blank above a target temperature, the rake tooth stamping device is used to stamp or punch the rectangular blank to form the rake body with rake tooth, the second stamping device is used to further stamp or punch the rake body to form its shoulder, the third stamping device is used to punch the rake handle blank repeatedly to make the rake handle blank become a column, and the roll forging device is used to forge the two outermost rake tooth (also called rake handle blanks) of the rake body to form two long rake handles The bending device is used for the one-step molding of rake handle.

The steel heating unit may be ordinary electric or gas heating furnace, or high-efficiency coal-fired heating furnace. The rake tooth stamping device consists of a upper stamping platform and a lower stamping platform, and the lower stamping platform has several stamping tooth with space equal to the width of the rake tooth, and the width between the outermost stamping tooth at the left and right sides is equal to the width of the reserved rake handle part. The stamping tooth of the top stamping platform are aligned with the spaces between the stamping tooth of the lower stamping platform, while the stamping tooth of the lower stamping platform are aligned with the spaces between the stamping tooth of the top stamping platform.

The second stamping device is used to cut off the shoulder, and it also consists of a upper stamping platform and a lower stamping platform. Place the blank stamped by the first stamping equipment on the lower stamping platform. The upper stamping platform is aligned with the shoulder of the lower stamping platform. The lower stamping platform has corresponding notch on the shoulder of the blank. Then, the upper stamping platform is aimed at the shoulder of the blank.

The roll forging device contains two pairs of revolving wheels with grooves, and each revolving wheel is semicircular or arched with another half in notch. The revolving wheels can rotate around the axis of the semicircle, while the grooves are along the peripheral direction of the revolving wheels. Of the two revolving wheels, one rotates clockwise, and another anticlockwise, i.e., the two wheels rotate in opposite direction. After being stamped to column, place the rake handle blank in the grooves of the revolving wheels, and make the revolving wheels rotate against the squeezing plate to achieve the extruding formation of the rake handle blank. More preferably, rake handle forging device may be used. Before forging the rake handle, forge the rake handle to column. The rake handle forging device consists of forging platform and forging pole. The distance between the downward movement extreme position of the forging pole and the lower forging platform is bigger than or equal to the diameter of the rake handle. The worker clamps the rake body blank with tool and place the rake handle blank on the forging platform. The forging platform rotates ceaselessly, so the rake handle is forged in column, then the rake handle is forged by the roll forging device.

The rake handle forming device is used to bend the rake handle bilaterally inward (on the same plane), and fold it together with the front end of the rake handle. The two rake handles are cut off at the same length manually and welded together. At last, by the lateral radian forging device, the whole rake body is forged in required radian (radian from the side).

As show in FIG. 2-6, the rake handle bending equipment consists of: body frame 1, motor drive 2 (including electric motor 2-1 and revolving wheel 2-2, the electric motor by the belt drives the revolving wheels rotate), slide rod 3, cross bending rod 4, carriage 5, bearings 6, arc sliding chute 7, arc baffle 8 and crankshaft connecting rod (or called eccentric revolving wheel) 9.

By connecting the output shaft of the revolving wheel driven by motor to the crankshaft of the crankshaft connecting rod can drive the crankshaft rotate. The connecting rod is connected to the crankshaft eccentrically, thus, when the crankshaft rotates, it can drive the connecting rod forward or backward push carriage 5 to move.

Figure 3:
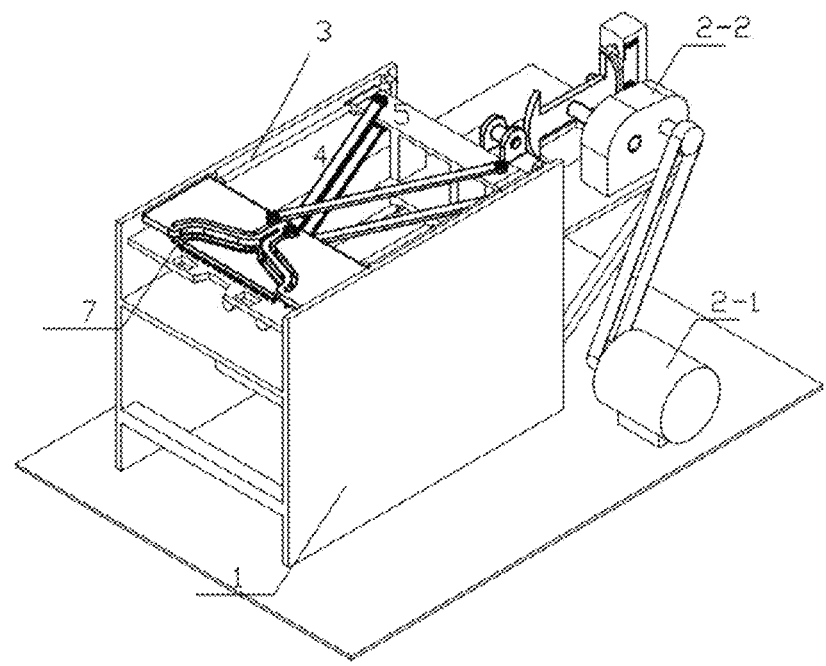
Figure 4:
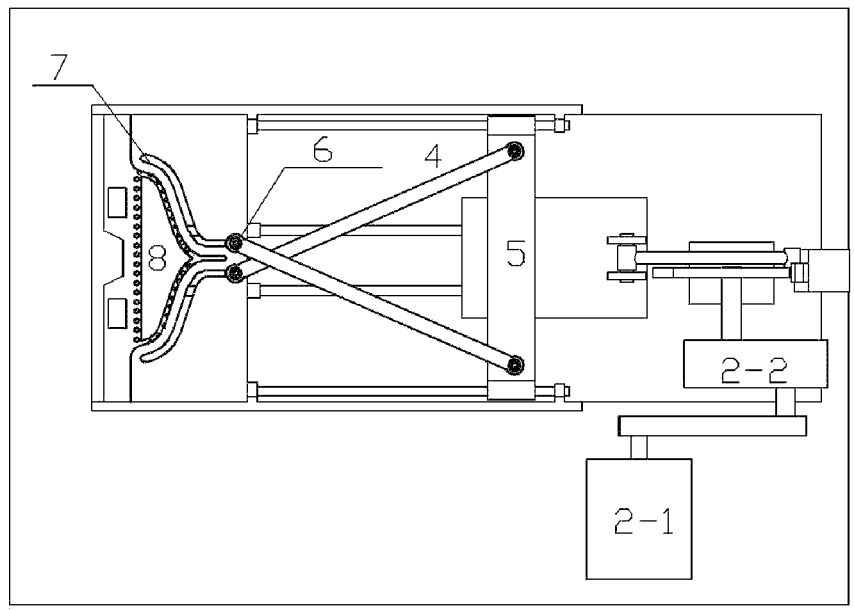
Figure 5:
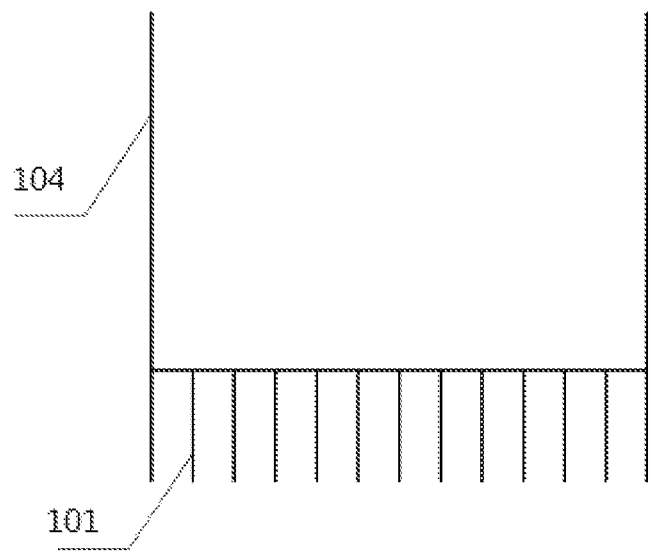
FIG. 5 is a Schematic Diagram of Bow-shape Conjointed Rake Produced by the Method of the Present Invention before the Rake Handle is Bent.
Figure 6:
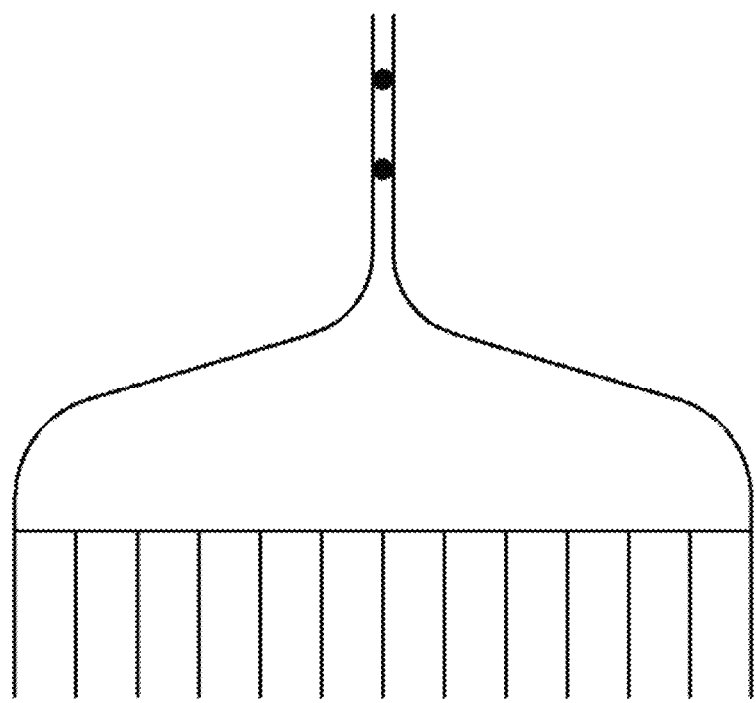
FIG. 6 is a Schematic Diagram of Bow-shape Conjointed Rake Produced by the Method of the Present Invention after the Rake Handle is Bent.
Figure 7:
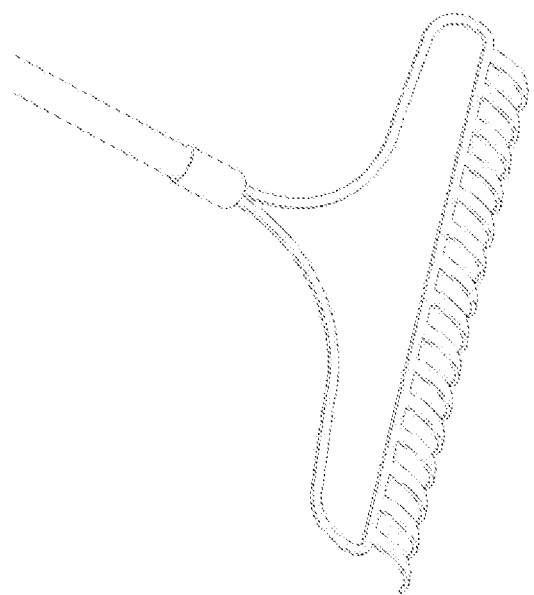
FIG. 7 is a schematic view of the Bow-shape Conjointed Rake Produced by the Method of the Present Invention.

The carriage 5 is installed on the slide rod 3, and it can slide along the slide rod 3 repeatedly. The cross bending rod 4 contains four connecting rods. One end of the first and the second connecting rods are fixed above the carriage 5, while their other ends are fixed on the upper ends of the first and the second bearings separately. The first and the second connecting rods cross each other, one end of the third and the forth connecting rods are fixed under the carriage 5, while their other ends are fixed on the lower end of the first and the second bearings. The bearings 6 have rollers underneath, and the two bearings 6 go through the two arc sliding chutes 7 separately and can slide to-and-fro in arc sliding chute 7. The arc baffle 8 is installed on body frame 1 which has action floor and rake body placing floor. The arc baffle 8, which is raised upward, is set on the rake body placing portion, and one side of such raised part is in plane structure, and the other side has two eccentric arc structures. When the bending equipment of the present invention is to work, the motor drives carriage 5 move forward, so the bearings 6 at the front end of the cross bending rod move forward to the rightmost (bottom) of the arc sliding chute 7, so that the first and the second bearings 6 separate from each other. Then insert the two rake handles of the rake body to be bent (as shown in FIGS. 3 and 5) between arc baffle 8 and the two bearings, specially, make the first rake handle between the arc baffle and one bearing, and the second rake handle between the arc baffle and the second bearing. By using the outside wall of the bearings or adding rollers on the bearings, the outsides of the two bearings can press against the rake handle. Then, the motor drives the carriage move backwards to drive the cross bending rod move backwards so that both the bearings 6 at the front end of the cross bending rod move toward the middle part and to the top of arc sliding chute 7, at the same time, force is applied to the two rake handles by the bearings or the rollers so that the rake handles turn to arc and meet at the top of the arc baffle.

The above are the preferred examples of the invention without restriction in any form to the invention. Within the spirit of the invention, any modification, change and omission, and substitution of the examples thereof with reference to the skills of the invention are within the protection scope of the invention.

The invention claimed is:

1. A method for forging a bow-shape conjointed rake with one-piece of steel, comprising the steps of:
   preparing a rectangular blank of steel including two longer sides of a same length between 35-60 cm and two shorter ends of a same width between 8-20 cm;
   heating the rectangular blank of steel to a target temperature of higher than 900° C.;

punching the rectangular blank of steel to mold rake teeth on one of the longer sides of the rectangular blank of steel, leaving two rake handle blanks each positioned at one shorter end of the rectangular blank of steel separated from the rake teeth, thereby obtaining a rake main body with the rake teeth on one longer side and a rake back on the other longer side;

cutting off two corners of the rake back at a slant;

bending the rake handle blanks away from the rake teeth so that they extend in a lateral direction;

heating the rake handle blank locally, and for each of the rake handle blanks, repeating two steps to lengthen the respective rake handle blank and make the respective rake handle blank a column shape, including a first step of forging one of the rake handle blanks in a direction perpendicular to respective rake handle blank and a second step of rotating the respective rake handle blank;

heating the column-shaped rake handle blanks locally, and stretching each of the rake handle blanks so that the rake handle blanks become longer and thinner for being used as rake handles;

bending the rake handles back to a direction reverse to the rake teeth;

bending the rake handles inward and forging two ends of the rake handles together; and bending all tips of the rake teeth of the bow-shape rake toward a direction perpendicular to the rake teeth to form arc shape rake teeth.

2. The method according to claim 1, wherein the rectangular blank is made of carbon steel.

\* \* \* \* \*